US 6,703,063 B2

(12) United States Patent
Takatsu

(10) Patent No.: US 6,703,063 B2
(45) Date of Patent: Mar. 9, 2004

(54) SWEET JELLIED PASTE, METHOD OF MANUFACTURING THE SAME, AND CAKE USING THE SAME

(76) Inventor: Seiko Takatsu, 3-22, Kobarigaoke, Niigatashi, Niigataken (JP)

(*) Notice: Subject to any disclaimer, the term of this patent is extended or adjusted under 35 U.S.C. 154(b) by 343 days.

(21) Appl. No.: 09/905,535

(22) Filed: Jul. 13, 2001

(65) Prior Publication Data
US 2002/0006462 A1 Jan. 17, 2002

(30) Foreign Application Priority Data
Jul. 14, 2000 (JP) .......................... 2000-214373
Mar. 7, 2001 (JP) .......................... 2001-063877

(51) Int. Cl.[7] .................. A23L 1/0532; A23L 1/20
(52) U.S. Cl. .................. 426/575; 426/575; 426/640; 426/629; 426/634; 426/506; 426/507; 426/518; 426/519
(58) Field of Search .................. 426/575, 640, 426/629, 634, 506, 507, 518, 519

(56) References Cited

U.S. PATENT DOCUMENTS

| 3,407,073 A | * | 10/1968 | Guidarelli ............... 426/241 |
| 5,364,643 A | * | 11/1994 | Morimoto et al. ........ 426/102 |
| 5,433,965 A | * | 7/1995 | Fischer et al. ............ 426/548 |
| 5,455,056 A | * | 10/1995 | Otsuki ...................... 426/244 |
| 5,853,789 A | * | 12/1998 | Hoshino et al. ........... 426/634 |
| 5,980,971 A | * | 11/1999 | Walsh ....................... 426/634 |
| 6,254,919 B1 | * | 7/2001 | Phillips .................... 426/640 |
| 6,482,457 B1 | * | 11/2002 | Margolis .................. 426/459 |

* cited by examiner

Primary Examiner—N. Bhat
(74) Attorney, Agent, or Firm—Akerman Senterfitt

(57) ABSTRACT

A sweet jellied paste which is produced without sugar, using materials which have medicinal properties. Dried fruits 1 are immersed in water to thereby obtain restored fruits and immersion water 2, which are then kneaded together with agar liquor 3 through several kneading processes including a first kneading process 4 and a second kneading process 5. Thus, respective materials are well mixed and harmonized, thereby obtaining healthy sweet jellied paste with an enhanced flavor.

16 Claims, 3 Drawing Sheets

SWEET JELLIED PASTE, METHOD OF MANUFACTURING THE SAME, AND CAKE USING THE SAME

BACKGROUND OF THE INVENTION a) Field of the Invention

The present invention relates to a sweet jellied paste or what is called Yokan in Japanese, method of manufacturing the same, and a cake using such paste.

b) Prior Art

Sweet jellied bean paste (or a bar of sweet jelly) is, as is widely recognized, manufactured by the steps of adding sugar to bean jam, boiling it down to certain consistency, adding agar thereto and then kneading the same into a certain solid state. Further, other various kinds of pastries are known in which some accessory materials such as Japanese chestnut are added as a raw material to the above sweet jellied bean paste, and powdered tea and/or powdered tangle weed (so called Kombu) are sometimes added thereto in order to improve the flavor thereof. Syrup of fig, persimmon or apple are sometimes added thereto.

In the meantime, conventional sweet jellied bean pastes would use a large amount of sugar. For example, one example of materials for conventional sweet jellied pastes would be 7 g agar, 300 cc water, 300 g granulated sugar, 600 g Ogura-an (very sweet Japanese adzuki bean paste) and 50 g glutinous starch syrup. To prevent life custom diseases (e.g., diabetes), however, ingesting such a large amount of sweets should be avoided.

SUMMARY OF THE INVENTION

Accordingly, it is a main object of the present invention to provide a novel sweet jellied paste which is produced without using sugar.

It is another object of the present invention to provide a method for manufacturing a sweet jellied paste without using sugar.

It is a further object of the present invention to provide a cake using such sweet jellied paste produced without using sugar.

To attain the above objects, there is provided a sweet jellied paste which is produced by the steps of: preparing immersion water, and then restoring dried fruits by immersing the same in the water; adding either the restored fruits or strained restored fruits to agar liquor together with the immersion water so that they are mixed; and kneading the same to a final product.

Accordingly, due to the sweetness obtained from the restored fruits and the immersion water, there can be provided a sweet jellied paste which is sweet enough despite using no sugar. Further, if the dried fruits are those which have medicinal properties, there can be provided a sweet jellied paste which is sweet enough despite using no sugar, having medicinal properties or healing powers.

From another embodiment of the invention, there can be provided a method for producing a sweet jellied paste, which comprises the steps of: preparing immersion water, and then restoring dried fruits by immersing the same in the water; adding either the restored fruits or strained restored fruits to agar liquor together with the water so that they are mixed; thermally kneading the same; further adding dried fruits and agar liquor thereto and mixing the same; further thermally kneading the same, and cooling it to a final product.

Accordingly, there can be provided a method for producing a sweet jellied paste which is sweet enough despite using no sugar. If the dried fruits are those which have medicinal properties, there can be provided a method for producing a sweet jellied paste which is sweet enough despite using no sugar, having medicinal properties or healing powers.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF PREFERRED EMBODIMENTS

Hereinafter are described preferred embodiments of the present invention with reference to the attached drawings.

Figure 1:
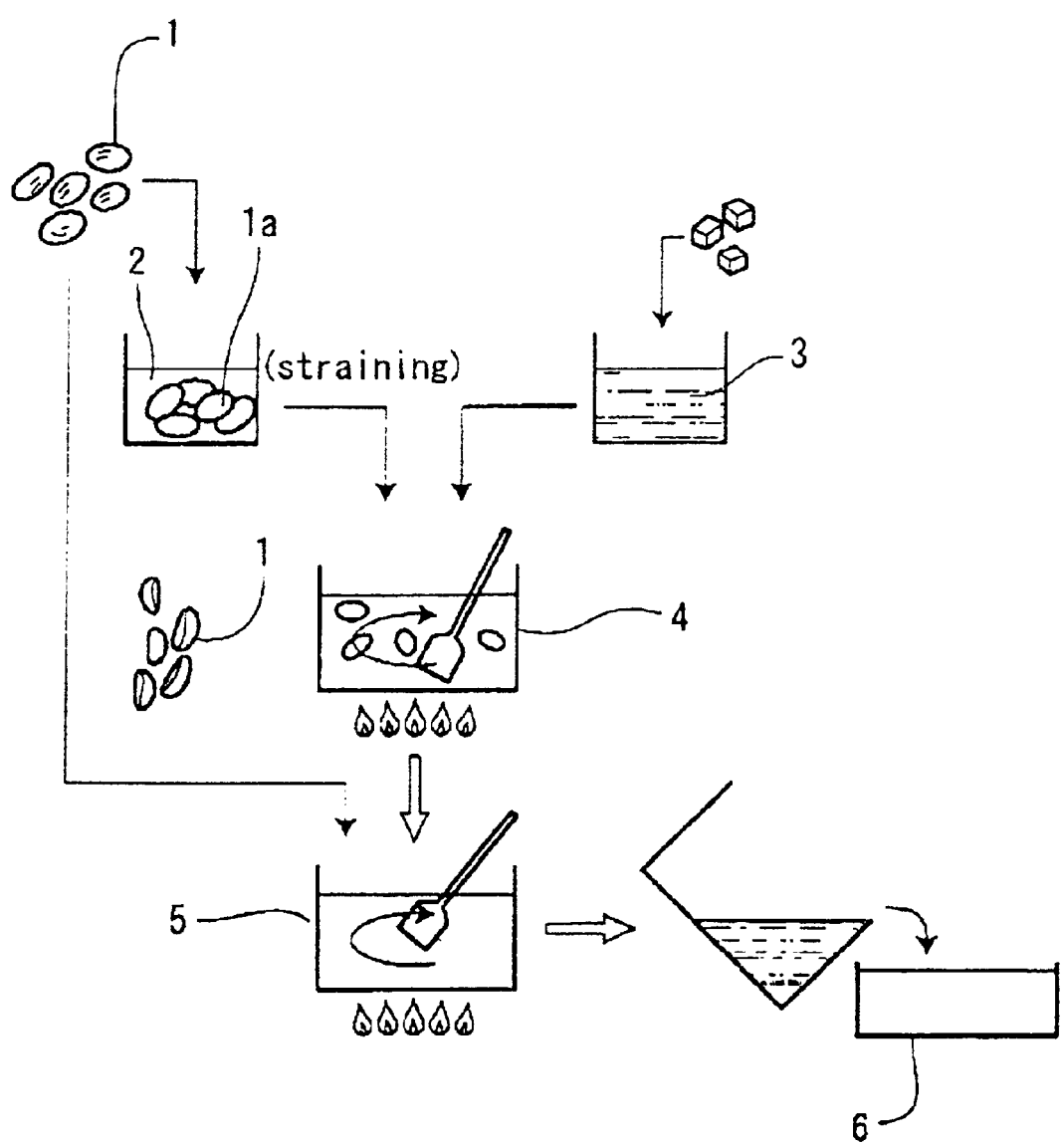
FIG. 1 is an explanatory diagram illustrating production steps of a sweet jellied paste in accordance with a first embodiment of the invention

FIG. 1 shows a first embodiment of the invention, in which a dried fruit is used as a material, whose production process is explained hereinafter.

In the embodiment, as the dried fruit material are used 20 pieces of black jujubes 1 (about 100 to 130 g), which are immersed in a cup of water (immersion water 2) a whole day and night so as to be restored to an original shape. About 10 g of agar liquor 3 is prepared by dissolving cube agar (or otherwise, powered agar or noodle agar) in about two cups of water and then heating the same up to about body temperature, while the restored fruits 1a are broken into flakes with or without being strained, added to said agar liquor 3, which are then subjected to heat treatment, while stirring it using a wooden ladle, adding the immersion water 2 thereto little by little, thereby performing a first kneading step 4 for about 30 minutes.

After the first kneading process 4 is finished, which is in a state where a certain degree of viscosity is obtained by evaporating water through the thermal kneading treatment, about 10 pieces of the dried black jujube, each of which is crushed to a half or any suitable size, are added, thus performing a second kneading process 5 for about 10 minutes. After a predetermined thermal kneading treatment is completed, it is allowed to flow into a mold 6 for sweet jellied paste, and then cooled and solidified to a final product. Alternatively, the second kneading treatment may be performed by adding a suitable amount of agar liquor 3 together with the dried black jujube 1 after the first kneading process where necessary.

Whilst the foregoing embodiment aims at a lightly-flavored finish, the foregoing first kneading process 4 may be modified if a comparatively heavily-flavored finish is preferred such that the restored fruits are strained, and then the coats thereof remaining in a strainer are minced, thereby performing a preliminary thermal kneading process for about 30 minutes in which a small amount of the minced coats and the immersion water 2 are added alternately, which is then added to the agar liquor 3 to perform the first kneading process 4.

It should be noted that the sweet jellied paste in the foregoing embodiment has an advantage as a health food, since a black jujube contained therein has medicinal properties to protect the liver, while agar also has medicinal properties to regulate the functions of the intestines. Needless to say, the dried fruits to be used should not be limited to the black jujube in the foregoing embodiment, but dried sycamore or any other suitable dried fruits may also be used.

Figure 2:
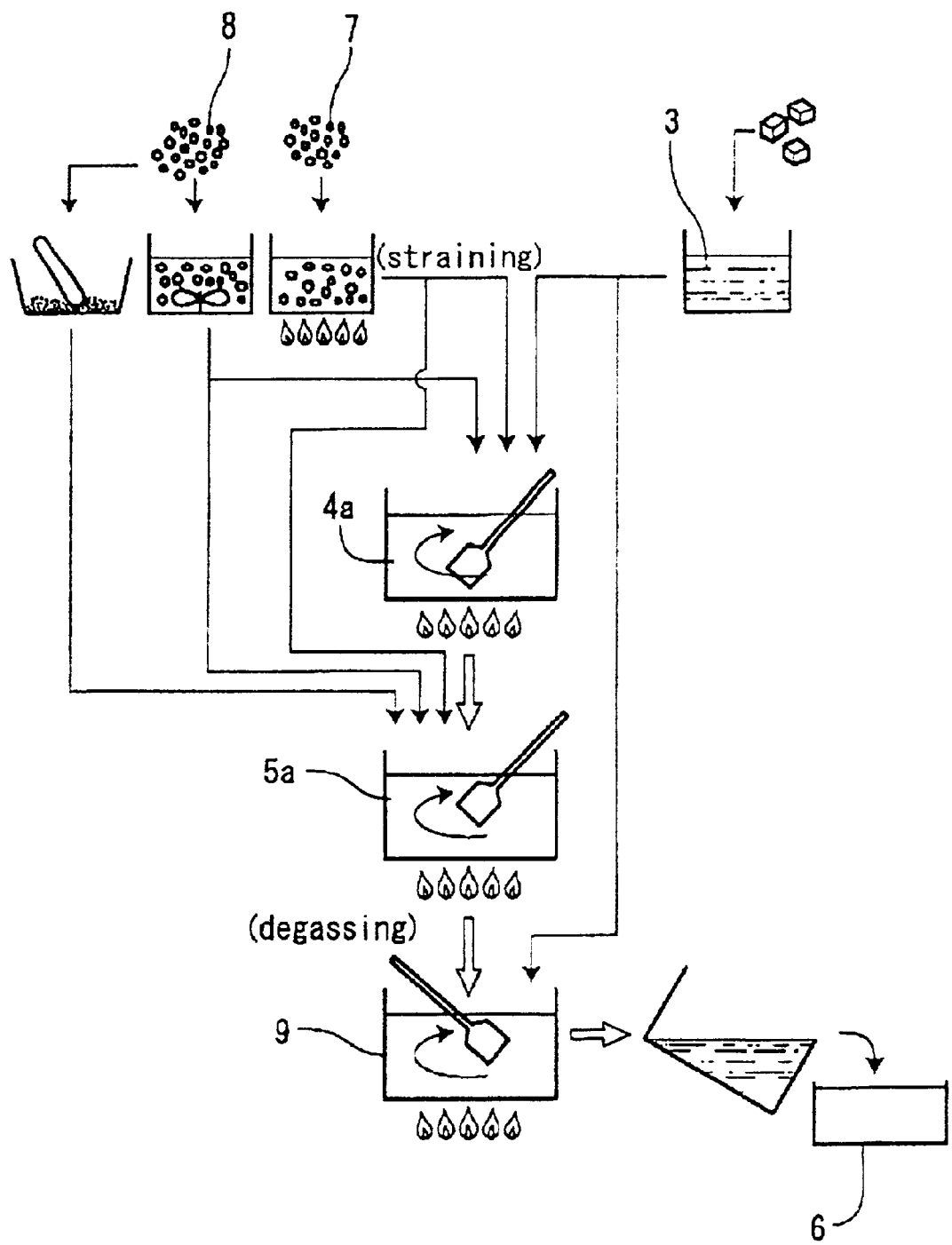
FIG. 2 is another explanatory diagram illustrating production steps of a sweet jellied paste in accordance with a second embodiment of the invention.

In FIG. 2 showing another production process in accordance with a second embodiment of the invention, beans are employed as main material. As follows is a description in line with the flow of the production process thereof.

150 g of green grams 7 (mung beans) are boiled in 4 and ½ cups of water, and then strained. About 200 g of green raisins 8 are employed as dried fruits, which are immersed in 1 and ½ cups of water (immersion water 2) for about 2 hours so as to be restored, and then mashed, using a mixer. In addition to that, another 100 g of the green raisins 8 is minced and then crushed to paste in a mortar.

The agar liquor 3 is prepared by dissolving 10 g of agar in 2 cups of water by boiling the same, which is then cooled to body temperature. To one half of the agar liquor 3 are added one half of the strained green grams and one half of the mashed green raisins, which are kneaded for about 15 minutes on middle low heat (a first kneading process 4a).

Thereafter, the remaining one half of the strained green grams and the mashed green raisins are added thereto and kneaded, which are further kneaded well while adding the green raisin paste thereto (a second kneading process 5a), thus flowing the product thus kneaded into the mold 6, degassing the same by applying suitable vibration thereto, in such a manner that strongly drops the mold 6 down to a cutting board, for example.

Alternatively, after the first kneading process, the second kneading process 5a may be performed by adding a suitable amount of the agar liquor 3 together with the green raisin paste, where necessary.

Subsequently, the paste obtained through the second kneading process 5a is cooled and solidified at normal temperature with the same being accommodated in the mold 6.

Then, the above cooled and solidified paste accommodated in the mold 6 and the remaining agar liquor 3 are kneaded again in a pan for about 10 minutes (a third kneading process 9), which is then flowed into the mold 6, solidified at normal temperature while degassing.

It should be noted that in the present embodiment in which beans are used as main materials, the paste which went through the second kneading process 5a is cooled and the agar liquor 3 is added thereto again, whereby such a sticky feel of eating which is specific to food that uses bean materials is decreased, resulting in better mouth feel and suave tastes.

As is apparent from the foregoing, there can be provided a sweet jellied paste which is sufficiently sweetened, using green grams which have fever-soothing and antidotal effects, cooling and thirst-quenching effects and diuretic effect, together with the green raisins that have a medicinal effect to prevent anemia. Needless to say, the combination of dried fruits and beans should not be limited to the foregoing, but other kinds of dried fruits and beans may be used. The mixing ratio of the dried fruits to the beans as well as the ratio thereof to the agar may be suitably chosen, depending on what is used as a raw material.

If the mixing ratio of agar is larger than that of the dried fruits and beans in the present embodiment, soft fruit/bean jelly (what is called mizuyokan in Japanese) is obtained. This is true of the first embodiment and a hereinafter described third embodiment as well in which respective soft fruit/bean jelly can be obtained by increasing the ratio of agar.

Figure 3:
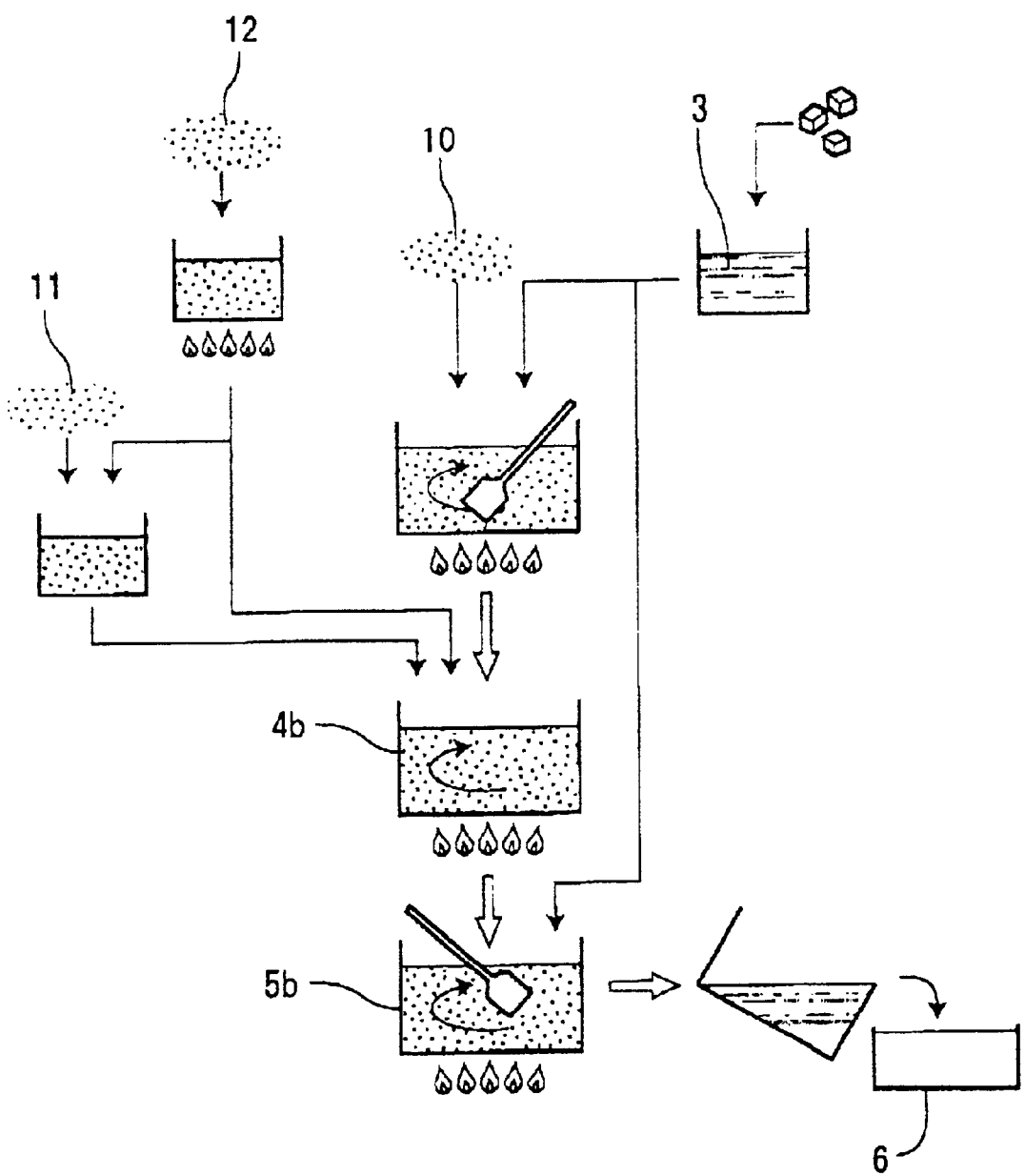
FIG. 3 is another explanatory diagram illustrating production steps of a sweet jellied paste in accordance with a third embodiment of the invention.

In FIG. 3 showing an explanatory diagram of a production process in accordance with a third embodiment of the invention, floured (powdered) grains are used as a main material, of which the manufacturing procedure is described hereinbelow:

Materials used in this embodiment are about 20 g of Tatar buckwheat tea 10, 5 g of Huai-Shan 11 (Chinese herbal medicine, i.e., processed yam) and 35 g of Luo-Han berries 12 together with the agar liquor 3 comprised of 5 g agar and 1 and ½ cups of water, said Luo-Han berries 12 being granulated, and mixed with water of 100–150 cc, and then melted by putting it over a fire. A small amount of the Luo-Han berries solution thus obtained is mixed with said Huai-Shan 11, which are kneaded while subjecting the same to heat treatment.

Then, to half the amount of the agar liquor 3 is added the Tatar buckwheat tea 10, which are kneaded sufficiently while heating the same, to which are further added the Luo-Han berries solution and the Huai-Shan paste little by little, thus knead the same sufficinetly (a first kneading process 4b).

Thereafter, the remaining half of the agar liquor 3 is added little by little, thus performing a second kneading process 5b. After predetermined thermal kneading process is completed, thus obtained paste is flowed into the mold 6, cooled and solidified to a final product.

Alternatively, after the first kneading process, the second kneading process may be performed by adding suitable amount of the material selected from among the Tatar buckwheat tea 10, Luo-Han berries solution and/or Huai-Shan paste together with the agar liquor 3.

If necessary, after the second kneading process 5b, the suitable amount of the agar liquor 3 may be further added to the cooled and solidified paste obtained after the process 5b, which may be kneaded again in a pan for about 10 minutes (a third kneading process). In that case, the paste is flowed into the mold 6 again after the third kneading process, and then solidified at normal temperature while degassing, thus obtaining desired sweet jellied paste.

It should be noted that in the present embodiment in which floured grains are used as materials, the paste which was subjected to the second kneading process is cooled, to which is added the agar liquor 3 again, whereby such a sticky feel of eating which is specific to food that uses floured grains as materials is decreased, resulting in better mouth feel and suave tastes.

Accordingly, there can be provided a sweet jellied paste which is extremely good for health, using Tatar buckwheat tea 10 which have effects to improve diabetes symptoms, Luo-Han berries 12 which have effects to improve the symptoms of diabetes, sore throat, asthma, hypertension and allergy, and the Huai-Shan 11 which have nourishing, and tonicity facilitating effects. Alternatively, other powdered grains than the aforesaid Tatar buckwheat tea may be used. The Luo-Han berries may be used after they are granulated or powdered.

Next is a description of a fourth embodiment of the invention, in which is at least one material selected from among grains, grain starch syrups, tea, vegetables, seaweed, seeds, nuts and berries, potatoes, sap and herbs added to the agar liquor 3 in the foregoing first kneading process 4, 4a or 4b, which are kneaded, while putting the same over a fire.

Where necessary, the above material(s) may be added in the foregoing kneading process 5, 5*a* or 5*b*.

Alternatively, other grain materials than the Tatar buckwheat tea used in the third embodiment may be employed, such as glutinous rice, non-glutinous rice, Japanese (barnyard) millet, millet or barley and wheat, either in the form of grain or in the form of powder or starch. In the case of employing the grain materials in the form of grain, they may be preliminarily cooked so as to be softened in advance where necessary.

If those grains are added as main materials, there can be obtained a sweet jellied paste which is flavored like Uirou, or Yubeshi (Japanese traditional sweet jellied bean paste products). For example, if rice starch is added as a main material in the respective foregoing embodiments while hereinafter-described Kudzu (i.e., arrowroot) starch is added, then the aforesaid Uirou-like-flavored jellied paste can be obtained. Further, if rice starch is added as a main material in the respective foregoing embodiments while wheat flour and hereinafter-described walnuts are added with an additional amount of a flavor enhancer such as miso (soybean paste), citron juice and its coats, then the aforesaid Yubeshi-like-flavored jellied paste can be obtained.

As the aforesaid grain syrups may be used glutinous rice syrup, millet syrup or un-milled rice syrup may be used. By adding these grain syrups, a more mild finish can be obtained. It should be noted that the grain syrups exemplified above have less sweetness than the dried fruits or glutinous starch syrup, and thus the purpose to add the grain syrups is to obtain a mild finish rather than to increase sweetness. In addition, the grain syrups serve as sugar content of carbohydrates, which is said to have a good influence on the functions of brains.

As vegetable materials may be used burdocks, lotus roots, carrots and other various kinds of vegetables. As burdocks contain oligosaccharide, it is good for health. When using such burdocks, they may be boiled and mashed before they are added, where necessary. The oligosaccharide contained in burdocks will be extracted by boiling the same for hours together with other food materials that include citric acid, such as ume or Japanese apricot, so that the sweetness can be obtained. Accordingly, when adding burdocks to agar liquor 3, a citric acid containing material such as ume or Japanese apricot may also be added thereto, thereby effectively obtaining sweetness. Alternatively, burdocks may be boiled together with such citric acid containing material in advance for hours, thus obtaining burdocks containing soup, which may be added to agar liquor 3 and mixed, and then thermally kneaded.

As tea materials may be used powdered green tea or the like. As seaweed material other than agar may be used wakame, mekabu, hijiki, funori, kombu (all being edible seaweed or alga collected in the sea near Japan). As seeds materials may be used sesame seeds, while as nuts materials may be used walnuts, chestnuts or the like. As potato materials may be used sweet potatoes, taros, yams, potatoes or the like, while as starch materials may be used starch of arrowroots, grains or potatoes. As sap material may be used sap obtained from maple trees, while as herb materials may be used leaves of mugwort or persimmon.

By adding suitable selection and/or combination of the above mentioned materials, there can be provided sweet jellied pastes with a variety of flavors and medicinal properties besides the above-mentioned Uirou-flavored or Yubeshi-flavored ones. In addition, by varying the mixing ratios of these materials, more paste-like products can be obtained so that they may be spread on bread, crackers and etc., or used for other various purposes.

Next is a description of a fifth embodiment of the invention, wherein the respective sweet jellied pastes of the foregoing embodiments are used for the existing cakes. Representatives of such existing cakes are Kintsuba, Anmaki and Dorayaki, which are Japanese traditional sweet cakes, using bean-jam as main sweetening material. In the fifth embodiment, the respective sweet jellied pastes of the foregoing embodiments are used instead of such sweetening bean-jam.

Although the bean-jam used in such existing cakes normally do not include agar, the respective sweet jellied pastes of the foregoing embodiments include agar as described above. As seaweed such as agar has an action to discharge a sugar content absorbed in the small intestine from one's body, the excessive intake of sugar can be prevented by eating such agar together with sweet tastes. Further, as no table sugar is used in the foregoing embodiments, it is further effective in order to prevent the excessive intake of sugar. In addition, as agar is partly decomposed by gastric acid into agarooligosaccharide that has an anticancer effect, the intake of agar will contribute to preventing cancer.

Alternatively, the respective sweet jellied pastes of the foregoing embodiments may be used for the existing cakes which do not include bean-jam. For example, they may be used as ingredients of a crepe.

As is apparent from the forgoing description, novel cakes with such a variety of tastes and flavors as well as medicinal properties can be provided by using the respective sweet jellied pastes of the foregoing embodiments in the existing cakes.

In the meantime, the present invention should not be limited to foregoing embodiments, but may be modified within a scope of the invention.

What is claimed:

1. A sweet jellied paste which is produced by the steps of:
   restoring dried fruits by immersing the dried fruits in water so as to obtain restored fruits and immersion water;
   adding either the restored fruits or strained restored fruits to agar liquor together with the immersion water and then mixing; and
   kneading the same to a final jellied paste.

2. A sweet jellied paste according to claim 1, wherein at least one material selected from the group consisting of grains, grain syrups, tea, vegetables, seaweed, seeds, nuts and berries, potatoes, starches, sap and herbs is added to said agar liquor, which is then kneaded to a final product. thermally kneading, and cooling the same again to a final jellied paste.

3. A cake in which the sweet jellied paste of claim 2 is used as a filling.

4. A cake in which the sweet jellied paste of claim 1 is used as a filling.

5. A sweet jellied paste which is produced by the steps of:
   restoring dried fruits by immersing the dried fruits in water so as to obtain restored fruits and immersion water;
   boiling beans, and then straining the same to obtain strained boiled beans;
   adding the strained boiled beans and either the restored fruits or strained restored fruits to agar liquor together with the immersion water, and then mixing them up; and
   kneading the mixture to a final jellied paste.

6. A sweet jellied paste according to claim 5, wherein at least one material selected from the consisting group of grains, grain syrups, tea, vegetables, seaweed, seeds, nuts and berries, potatoes, starches, sap and herbs is added to said agar liquor, which is then kneaded to a final jellied paste.

7. A cake in which the sweet jellied paste of claim 5 is used as a filling.

8. A sweet jellied paste which is produced by the steps of:
   preparing granulated Luo-Han berries, powdered Luo-Han berries or a solution of Luo-Han berries;
   adding floured grains and at least one of said material selected from the group consisting of granulated Luo-Han berries, powdered Luo-Han berries and a solution of the Luo-Han berries to agar liquor, and then mixing;
   kneading the mixture to a final jellied paste.

9. A sweet jellied paste according to claim 8, wherein at least one material selected from the group consisting of grains, grain syrups, tea, vegetables, seaweed, seeds, nuts and berries, potatoes, starches, sap and herbs is added to said agar liquor, which is then kneaded to a final jellied paste.

10. A cake in which the sweet jellied paste of claim 8 is used as a filling.

11. A method for producing a sweet jellied paste, which comprises the steps of:
    restoring dried fruits by immersing them in water so as to obtain restored fruits and immersion water;
    adding either the restored fruits or strained restored fruits to agar liquor together with the immersion water, and then mixing them up;
    thermally kneading the same;
    adding an additional amount of dried fruits and agar liquor thereto and mixing the same;
    further thermally kneading, and cooling the same to a final jellied paste.

12. A method for producing a sweet jellied paste according to claim 11, wherein at least one material selected from the group consisting of grains, grain syrups, tea, vegetables, seaweed, seeds, nuts and berries, potatoes, starches sap and herbs is added to said agar liquor, which is then thermally kneaded to a final jellied paste.

13. A method for producing a sweet jellied paste, which comprises the steps of:
    restoring dried fruits by immersing them in water so as to obtain restored fruits and immersion water, said restored fruits being mashed, using a mixer where necessary;
    boiling beans, and then straining the same to obtain strained boiled beans;
    adding the strained boiled beans and either the restored fruits or strained restored fruits to agar liquor together with the immersion water, and then mixing the same;
    thermally kneading the same;
    adding an additional amount of the strained boiled beans, restored fruits, dried fruits paste, and/or agar liquor thereto and mixing the same;
    further thermally kneading, and then cooling the same;
    further adding an additional amount of the agar liquor thereto after being cooled; and
    thermally kneading the same to a final jellied paste.

14. A method for producing a sweet jellied paste according to claim 13, wherein at least one material selected from the group consisting of grains, grain syrups, tea, vegetables, seaweed, seeds, nuts and berries, potatoes, starches sap and herbs is added to said agar liquor, which is then thermally kneaded to a final jellied paste.

15. A method for producing a sweet jellied paste, which comprises the steps:
    preparing granulated Luo-Han berries, powdered Luo-Han berries or a solution of Luo-Han berries;
    adding floured grains and at least one material selected from the group consisting of granulated Luo-Han berries, powdered Luo-Han berries and a solution of the Luo-Han berries to agar liquor, and then mixing;
    thermally kneading thus obtained mixture;
    adding an additional amount of the floured grains, one of the Luo-Han berries, floured Luo-Han berries and the solution thereof and the agar liquor thereto, and then mixing them up;
    further thermally kneading, and then cooling the same;
    adding an additional amount of the agar liquor thereto after being cooled; and
    thermally kneading, and cooling the same to a final jellied paste.

16. A method for producing a sweet jellied paste according to claim 15, wherein at least one material selected from the group consisting of grains, grain syrups, tea, vegetables, seaweed, seeds, nuts and berries, potatoes, starches sap and herbs is added to said agar liquor, which is then thermally kneaded to a final jellied paste.

* * * * *